US012570768B2

(12) United States Patent
Wohlgefahrt et al.

(10) Patent No.: US 12,570,768 B2
(45) Date of Patent: Mar. 10, 2026

(54) CELLULOSE ETHERS WITH DELAYED SOLUBILITY AND HAVING A REDUCED GLYOXAL CONTENT

(71) Applicant: SE TYLOSE GMBH & CO. KG, Wiesbaden (DE)

(72) Inventors: Sarah Wohlgefahrt, Wiesbaden (DE); Veronique Esser, Wiesbaden (DE)

(73) Assignee: SE Tylose GmbH & Co. KG, Wiesbaden (DE)

( * ) Notice: Subject to any disclaimer, the term of this patent is extended or adjusted under 35 U.S.C. 154(b) by 626 days.

(21) Appl. No.: 17/917,320

(22) PCT Filed: Apr. 8, 2021

(86) PCT No.: PCT/EP2021/059206
§ 371 (c)(1),
(2) Date: Oct. 6, 2022

(87) PCT Pub. No.: WO2021/204957
PCT Pub. Date: Oct. 14, 2021

(65) Prior Publication Data
US 2023/0151120 A1 May 18, 2023

(30) Foreign Application Priority Data
Apr. 9, 2020 (DE) .................... 10 2020 110 058.2

(51) Int. Cl.
*C08B 15/00* (2006.01)
*C08B 11/20* (2006.01)

(52) U.S. Cl.
CPC ............ *C08B 15/005* (2013.01); *C08B 11/20* (2013.01)

(58) Field of Classification Search
CPC .............................. C08B 11/20; C08B 15/005
See application file for complete search history.

(56) References Cited

U.S. PATENT DOCUMENTS 2,879,268 A 3/1959 Ingvar
3,072,635 A 1/1963 Hanus et al.

2004/0167326 A1* 8/2004 Brackhagen .......... C08B 15/005
536/120
2015/0203596 A1 7/2015 Kim et al.
2019/0062458 A1 2/2019 Schneiderman et al.

FOREIGN PATENT DOCUMENTS

| | | |
|---|---|---|
| DE | 1 075 773 A | 2/1960 |
| DE | 1 239 672 A | 5/1967 |
| DE | 101 36 450 A1 | 2/2003 |
| EP | 0 597 364 A1 | 5/1994 |
| EP | 1 316 563 A1 | 6/2003 |
| EP | 1 452 544 B1 | 5/2007 |
| EP | 2 177 538 A1 | 4/2010 |
| GB | 1 465 934 A | 3/1977 |
| WO | 2012/122153 A1 | 9/2012 |
| WO | 2014/175903 A1 | 10/2014 |
| WO | 2017/064164 A1 | 4/2017 |

OTHER PUBLICATIONS

Lieberman et al., Pharmaceutical Dosage Forms: Disperse Systems, 1996, 2nd edition, Informa Health Care, p. 207-209, (Year: 1996).*
Thielking, et al., "Cellulose Ethers", Chapter 2.1., Ullmann's Encyclopedia of Industrial Chemistry, Weinheim, Germany, 2006, vol. 7, pp. 381-397.
International Search Report, PCT/EP2021/059206, filed Oct. 14, 2021.
International Preliminary Report on Patentability, PCT/EP2021/059206, filed Oct. 14, 2021.

* cited by examiner

*Primary Examiner* — Jonathan S Lau
(74) *Attorney, Agent, or Firm* — ProPat, LLC; Cathy R. Moore

(57) ABSTRACT

The invention relates to a method for preparing cellulose derivatives which are reversibly cross-linked with glyoxal and thus display delayed water solubility. In the methods, a water-wetted cellulose derivative is mixed at a temperature of between 20 to 70° C. with an aqueous solution containing glyoxal, a monovalent or polyvalent organic acid, and at least one alkaline earth salt and/or alkali salt of phosphoric acid as a buffer substance to reversibly crosslink the cellulose derivative. The amount of glyoxal is 0.010 to 0.050 mol, in each case in relation to 1 mol of anhydroglucose units of the cellulose derivative, and the molar ratio of monovalent or polyvalent organic acid to glyoxal is in the range of 1:1 to 1:12. The cellulose derivative is then dried and milled, and the drying and milling may also be combined. The invention also relates to cellulose derivatives produced according to the method.

29 Claims, No Drawings

CELLULOSE ETHERS WITH DELAYED SOLUBILITY AND HAVING A REDUCED GLYOXAL CONTENT

CROSS-REFERENCE TO RELATED APPLICATIONS

This application is being filed under 35 U.S.C. § 371 as a National Stage Application of pending International Application No. PCT/EP2021/059206 filed Apr. 8, 2021, which claims priority to the following parent application: German Patent Application No. 10 2020 110 058.2, filed Apr. 9, 2020. Both International Application No. PCT/EP2021/059206 and German Patent Application No. 10 2020 110 058.2 are hereby incorporated by reference herein in their entirety.

FIELD OF THE INVENTION

The present invention relates to a process for producing cellulose derivatives reversibly crosslinked with glyoxal and thus having delayed water-solubility.

BACKGROUND OF THE INVENTION

On account of their outstanding properties, such as swelling, gel-forming and dissolution behavior, cellulose ethers are put to diverse use for example as thickeners, adhesives, binding and dispersing agents, humectants, protective colloids, and stabilizers, and also as suspending and emulsifying agents and film formers.

These uses require the cellulose ethers to be emulsified, dispersed or dissolved without lumps. The dissolving of a cellulose ether—in dry powder form—in water, however, often leads to surface gelling and lumping. This problem may be resolved by treatment with sufficient amounts of dialdehydes, especially glyoxal. Through the formation of hemiacetals, which is subject to an acidic catalytic mechanism, a reversible crosslinking is produced which, while having no substantial influence on the solubility, improves the dispersibility, delays dissolution in water, and prevents lumps forming. This retarded dissolution can be reduced by increasing the pH ("Cellulose Ethers", Chapter 2.1., Ullmann's Encyclopedia of Industrial Chemistry, 2006, Wiley-VCH Verlag GmbH, Weinheim, Germany).

WO 2017/064164 A1 discloses a cellulose ether crosslinked temporarily with a glyoxalic acid $(C_1-C_4)$alkyl ester mono$(C_1-C_4)$alkyl acetal. The fraction of the crosslinker is preferably 0.01 to 10 parts by weight per 100 parts by weight of the cellulose ether. EP 2 177 538 A1 relates to a cellulose ether containing alkyl and hydroxyethyl groups which has been mixed with a crosslinker and then subjected to grinding-drying. The crosslinker is preferably a mono- or dialdehyde, more preferably glyoxal. According to US 2019/0062458 A1, a crosslinked, water-insoluble cellulose is used for producing membranes or hydrogels. The crosslinker may be an aldehyde, an organochloride, an ether, a polyfunctional carboxylic acid, glycerol, a urea derivative and/or a glycidyl ether.

DE 10 75 773 disclosed the crosslinking of cellulose ether with glyoxal for improved solubility and/or for preventing agglomeration during dissolution. For this crosslinking, the cellulose ether was suspended in acetone and an aqueous glyoxal solution was added.

U.S. Pat. No. 3,072,635 describes a process for producing water-dispersible cellulose derivatives by treatment with 0.001 to 0.2 mol of glyoxal per mole of anhydroglucose unit of the cellulose ether, where the glyoxal was dissolved in alcohol and the cellulose ether contained amounts of glyoxal of preferably greater than 1.25 to 5.0% by weight.

Part of the disclosure of DE 12 39 672 was the possibility of controlling the degree of crosslinking and hence the retarded dissolution via the amount of glyoxal. This is apparent from the examples given. There, water-soluble methyl cellulose is kneaded homogeneously with 0.001 to 0.2 mol of glyoxal per mole of anhydroglucose unit of the methylcellulose at a pH between 2 to 7, and is dried and comminuted. It is shown that 0.48% by weight of glyoxal in the cellulose derivative at a pH of 2 (established using phosphoric acid) leads only to a 15-minute solvation delay. No figures are given for unbound glyoxal content. Nor is there any portrayal of crosslinking at higher pH values and description of the associated solvation delay.

EP 0 597 364 discloses a process in which sodium dihydrogenphosphate is added to the glyoxal solution.

EP 1 316 563 A1 relates to a process for producing glyoxal-crosslinked cellulose ethers without addition of acidic catalysts. In this case, the viscosity reduction is diminished with raising of the pH of the cellulose ether. It must be noted that the solvation delay is lowered as a result of the raising of the pH. The delay time of a methylhydroxyethylcellulose MHEC containing 1.7% by weight of glyoxal and having a pH of 6.2 is only 20 min in demineralized water, relative to a delay time of 60 min for a crosslinked MHEC with 2.0% by weight of glyoxal and having a pH of 4.7.

Glyoxal is classified according to the CLP Regulation (Regulation (EC) No. 1272/2008) as irritating and also sensitizing and a mutagenic effect on humans is assumed. A product having a free glyoxal content of 0.1% to 1% must be labeled accordingly in agreement with the CLP Regulation. The use of glyoxal-crosslinked cellulose ethers in the personal care sector is likewise possible if the producer of cosmetic products ensures that the end product does not exceed the permitted concentration of 100 ppm of glyoxal (SCCP/0881/05). Because the glyoxal used for the reversible crosslinking is released again when the cellulose ether is dissolved in aqueous medium, it is necessary to minimize not just the unbound but rather the total amount of glyoxal in the end product, on the basis of the classifications in the CLP Regulation.

EP 1 452 544 B1 describes a process in which cellulose ethers with reduced unbound glyoxal content are produced by addition of water-soluble borates or aluminum salts to the phosphate-buffered crosslinker solution. Here as well it is apparent that, while the amount of unbound glyoxal can be lowered, there is a reduction in the solvation delay because of the addition of sodium tetraborate and the associated raising of the pH. There are also no evident comments on the storage stability. In addition, however, the glyoxal-reduction effect is low and the additives additionally employed are likewise not unobjectable from a toxicological standpoint.

In NO 2012/122153 A1 there is a dry blend composed of standard commercial cellulose ether, crosslinked reversibly with glyoxal, and of a pulverulent, solid, water-soluble polycarboxylic acid, which is partly neutralized. The acid is preferably a partly neutralized poly(meth)acrylic acid, polymaleic acid, citric acid, adipic acid, oxalic acid, malonic acid or glutaric acid. When the crosslinked cellulose ether is stirred into water, the acid lowers the pH, and so the hemiacetal bonds are more slowly broken and formation of lumps is prevented. WO 2014/175903 relates to a method for the lump-free dispersing of a dry cellulose ether formulation into an aqueous solution. The cellulose ether formulation comprises a reversibly crosslinked cellulose ether and a solid, water-soluble acid, preferably citric acid, tartaric acid, oxalic acid, malonic acid or poly(meth)acrylic acid. The formulation is likewise a dry blend composed of a standard commercial crosslinked cellulose ether and of an acid.

SUMMARY OF ADVANTAGEOUS EMBODIMENTS OF THE INVENTION

The present invention aims to reduce the content of bound and unbound glyoxal in a cellulose ether without altering the properties of the cellulose ether, particularly the solvation delay and the viscosity. The intention thereby is to considerably minimize the health risk and to avoid mandatory labeling.

Unexpectedly, it has been found that through the addition of acidic organic catalysts, specifically of organic acids which have a basicity of one or more or are aromatic, to the glyoxal solution, buffered with alkali metal salts or alkaline earth metal salts of phosphoric acid, it is possible to boost the efficiency of the glyoxal crosslinking, allowing the amount of glyoxal used to be markedly reduced. The solvation delay for the cellulose ether produced in the invention with reduced glyoxal content is comparable with that for a cellulose ether produced according to the prior art. The anticipated reduction in viscosity through the lowering of the pH of the product did not, surprisingly, occur.

DETAILED DESCRIPTION OF ADVANTAGEOUS EMBODIMENTS OF THE INVENTION

A subject of the invention is therefore a process for producing cellulose derivatives reversibly crosslinked with glyoxal and thus having delayed water-solubility, with the steps of:

a) providing a water-moist cellulose derivative, b) providing an aqueous solution comprising glyoxal, one and/or more alkaline earth metal salts and/or alkali metal salts of phosphoric acid as buffer substance, c) mixing the aqueous solution from b) with the cellulose derivative from a) at a temperature between 20 to 70° C. to achieve reversible crosslinking of the cellulose derivative, d) drying the reversibly crosslinked cellulose derivative and e) grinding the cellulose derivative, where steps d) and e) may be combined into a grinding-drying operation, where the process is characterized in that the aqueous solution as per b) comprises an organic acid having a basicity of one or more, where the amount of the organic acid having a basicity of one or more is 0.002 to 0.015 mol and the amount of the glyoxal is 0.010 to 0.030 mol, in each case per mole of anhydroglucose units of the cellulose derivative, and the molar ratio of monobasic organic acid to glyoxal is in the range from 1:1 to 1:6, preferably from 1:1 to 1:4, the ratio of dibasic organic acid to glyoxal is in the range from 1:1 to 1:10, preferably from 1:2 to 1:6, and the molar ratio of tribasic organic acid to glyoxal is in the range from 1:2 to 1:12, preferably from 1:3 to 1:8.

Additional subjects of the invention are the reversibly crosslinked cellulose derivative as such produced by the stated process, i.e., cellulose derivatives reversibly crosslinked with glyoxal, which are characterized in that the fraction of the organic acid having a basicity of one or more is 0.002 to 0.015 mol and the amount of the glyoxal is 0.010 to 0.050 mol, in each case per mole of anhydroglucose units of the cellulose derivative, and the molar ratio of organic acid having a basicity of one or more to glyoxal is in the range from 1:2 to 1:12. The reversibly crosslinked cellulose derivatives of the invention contain preferably less than 1000 ppm of free glyoxal.

The organic acids are aliphatic, aromatic and/or heterocyclic, preferably C1-C7 carboxylic acids having one to three carboxyl groups, which may also contain functional groups, e.g., hydroxyl groups and/or amino groups. The aromatic and heterocyclic acids may additionally possess nitrogen, oxygen or sulfur as heteroatom. The aliphatic acids may likewise have at least one double bond. Acids used more preferably are those which are employed in the pharmaceutical and/or food sector. For the monocarboxylic acids with a $pK_a$ range of greater than or equal to 2.5 and less than 5, these are acetic acid, lactic acid and salicylic acid, and for the di- or tricarboxylic acids with a $pK_{a1}$ range from 2.5 to 5 and a $pK_{a2}$ of less than or equal to 6, these are preferably adipic, tartaric or malic acid. General preference is given to carboxylic acids which are solid under standard conditions. They are also easier to meter. Acetic acid is less preferred owing to the intensive odor and the relatively high volatility. The amount of acid is 0.002 to 0.015 mol, more preferably 0.004 to 0.010 mol, in each case per mole of anhydroglucose units of the cellulose ether.

Glyoxal is used preferably in the form of an about 40% by weight aqueous solution. The amount of gloxal is 0.010 to 0.050 mol, more preferably 0.015 to 0.025 mol, in each case per mole of anhydroglucose units of the cellulose ether.

Buffers used are the alkali metal salts or alkaline earth metal salts of phosphoric acid, more preferably the alkali metal salts of phosphoric acid, very preferably sodium dihydrogenphosphate monohydrate and disodium hydrogenphosphate. The amount of sodium dihydrogenphosphate and disodium hydrogenphosphate is in each case preferably 0.003 to 0.015 mol, more preferably in each case 0.005 to 0.009 mol, in each case per mole of anhydroglucose units of the cellulose ether.

The cellulose derivative employed is preferably a water-moist cellulose ether obtained after hot-water washing, with a moisture content of 30 to 70% by weight. This water-moist cellulose ether is kneaded with a solution, preferably aqueous, consisting of the acid to be used, of the phosphate salts and of glyoxal, and is subsequently dried and ground or subjected to a grinding-drying operation. This solution is utilized to establish pH and to increase the efficiency of the glyoxal crosslinking. As a result, the amount of glyoxal used can be significantly reduced, while solvation delays are obtained that are the same as those for a cellulose ether produced according to the prior art.

EXAMPLES

In the tables set out below and in the examples, the percentage fractions are reported in percentages by weight.

For verifying the storage stability of the cellulose ethers produced in the invention, the aging of the samples is simulated with an accelerated test in accordance with ASTM D6819. For this test, the air-dry cellulose ethers are transferred into glass vessels having temperature-stable and leak-proof closure caps. It should be ensured that the ratio of the mass of the sample to be aged to the volume of the glass vessel is always identical (2.76 g of absolutely dry (bone dry) cellulose ether in 100 ml). The sample is subsequently adjusted to a constant moisture content of 10% by weight and stored at 100° C. for 6 h.

The solvation delays reported were measured using a Brabender Viscograph (single-speed 75 rpm, load cell 250 cmg, measuring pot and measuring sensor with pins) in aqueous solution (with mains water, at 20° C.). Solvation time ST is the time in minutes between the addition of the product and the attainment of a viscosity of 100 Brabender Units (BU)=65 mPa·s. Solvation end time SET is the time in minutes after which there is no longer any increase in viscosity. For the individual viscosity stages, the concentration of the measurement solution, the initial mass of substance and the amount of dissolution water are evident from the table below.

| Viscosity stage [mPa * s] | Concentration of the measurement solution [%] | Initial mass of substance [g] | Dissolution water [g] |
|---|---|---|---|
| ≤50 | 5 | 21.5 | 409 |
| >50/≤150 | 4 | 17.2 | 413 |
| >150/<600 | 3 | 12.9 | 417 |
| 600-1500 | 2.5 | 10.75 | 419 |
| 2000-4000 | 2 | 8.6 | 421 |
| >4000-30000 | 1.5 | 6.45 | 424 |
| >30000 | 1 | 4.3 | 426 |

The pH of the cellulose ether was determined from a 1% by weight aqueous solution of the absolutely dry cellulose ether by means of a pH meter with combined pH electrode.

The viscosity of the cellulose ethers was measured using a Brookfield rotational viscometer (model DVI) and using a No. 5 spindle for the 16 000 mPa·s viscosity stage and a spindle 4 for the 5000 mPa·s viscosity stage, with a rotary speed of 20 rpm, from a 1.9% by weight aqueous solution of the absolutely dry cellulose ether at 20° C. The water used to produce the sample solution had a hardness of 20°dH (German hardness).

The quantitative determination of the methoxy (—$OCH_3$), hydroxyethyl (—$OC_2H_4$), and hydroxypropyl (—$OC_3H_6$) contents and the calculation of DS (average degree of substitution) and MS (molar degree of substitution) were ascertained according to the Zeisel method familiar to the skilled person, by reaction with hydriodic acid and subsequent GC analysis of the resultant alkyl iodides according to Z. Anal. Chem. 286 [1997] 161-190.

The total glyoxal content was ascertained by colorimetry through the reaction of the dissolved glyoxal with 3-methyl-2-benzothiazolinone hydrazone hydrochloride (MBTH) in an acidic medium. For this reason, 0.1 g of air-dry cellulose ether were dissolved in 100 g of distilled water for 24 h. The dissolution procedure here should not be accelerated by alkalification. 2 ml of the cellulose ether solution were pipetted into the reaction vessel And 5 ml of the reagent solution (consisting of 0.2 g of MBTH, 10 g of demineralized water and 40 g of glacial acetic acid) were added thereto via pipette. The reaction vessels were closed, and the reaction mixtures were briefly mixed by shaking and were left to stand in the dark for 2 h. After a reaction time of 2 h, the absorbance of the sample and of the blank sample was measured at 405 nm in a 1 cm cuvette in the Dr. Lange CADAS 100 photometer. The absorbance of the sample had to be between 0.100 and 2.000. In the case of an absorbance below 0.100, the result is to be reported as <400 ppm of glyoxal. If the absorbance was above 2.000, the CE solution was diluted by serial dilution prior to the reaction.

Calculation $$\frac{(E_P - E_0) * 4.207 * 100 * F}{E} = \text{ppm of glyoxal}$$

$E_p$=Absorbance of sample
$E_0$=Absorbance of blank sample
F=Dilution factor
E=Initial mass in g
4.207=Slope of the calibration line To determine the free, i.e., unbound, glyoxal, 0.2 g of the air-dried cellulose ether were admixed with 10 ml of tetrahydrofuran. This THF-cellulose ether suspension was shaken with a shaker machine for 4 h and then filtered via a fluted filter into a test tube. 2 ml of the extract were admixed with 5 ml of MBTH reactant solution (consisting of 0.2 g of MBTH, 10 g of demineralized water and 40 g of glacial acetic acid), left to stand in the dark for 2 h, and subsequently subjected to colorimetric measurement at 405 nm (CADAS 100 photometer from Dr. Lange) (see operations for determining the total glyoxal content).

Example 1

Water-moist methylhydroxyethylcellulose MHEC (200 g of dry matter) with an average degree of substitution DS(methyl) of 1.55 (the DS denotes the average number of methyl groups per anhydroglucose unit) and a molar degree of substitution MS(hydroxyethyl) of 0.22 (the MS denotes the average number of hydroxyethyl groups per anhydroglucose unit) and with a viscosity of 16 000 mPa·s was placed in an LK5 laboratory kneader from Erweka Apparatebau GmbH, where it was mixed with an aqueous solution of water, citric acid, sodium hydroxide and glyoxal. The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A target final moisture content was less than 5%.

| | Batch No. 1 (comparative) |
|---|---|
| Buffer | |
| NaOH/AGU(MHEC) (mol/mol) | 0.015 |
| Glyoxal/AGU(MHEC) (mol/mol) | 0.046 |
| Acid/AGU(MHEC) (mol/mol) | 0.008 |
| NaH$_2$PO$_4$*H$_2$O/AGU(MHEC) (mol/mol) | 0 |
| Na$_2$HPO$_4$/AGU(MHEC) (mol/mol) | 0 |
| Acid | Citric acid |
| crosslinked MHEC | |
| pH | 5.7 |
| Viscosity (mPas) | 12140 |
| Total glyoxal (ppm) | 13885 |
| Free glyoxal (ppm) | 1279 |
| ST (min) | 29 |
| SET (min) | 43 |
| aged crosslinked MHEC | |
| pH | 4.8 |
| Viscosity (mPas) | 9580 |
| ST (min) | 42 |
| SET (min) | 57 |
| Postcrosslinking [aged ST * 100/ST-100] (%) | 45 |

Example 2

Water-moist MHEC (200 g of dry matter) with an average degree of substitution DS (methyl) of 1.55 and a molar degree of substitution MS (hydroxyethyl) of 0.22 and with a viscosity of 16 000 mPa*s was placed in an LK5 laboratory kneader from Erweka Apparatebau GmbH, where it was mixed with an aqueous solution of water, sodium dihydrogenphosphate-$H_2O$, disodium hydrogenphosphate and glyoxal. The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A final moisture content of less than 5 S was achieved.

crosslinking, the solvation delay ST is lower. The postcrosslinking, captured through the simulation of aging, was increased, however, for the cellulose ethers using the phosphate buffer (example 2-1).

Example 3

Water-moist MHEC (200 g of dry matter) with an average degree of substitution DS (methyl) of 1.55 and a molar degree of substitution MS (hydroxyethyl) of 0.22 and with a viscosity of 16 000 mPa·s was placed in an LK5 laboratory kneader from Erweka Apparatebau GmbH, where it was mixed with an aqueous solution of sodium dihydrogenphosphate·$H_2O$, disodium hydrogenphosphate, citric acid, water and glyoxal. The target moisture content

| | Batch No. | | |
|---|---|---|---|
| | 1 (comparative) | 2-1 (comparative) | 2-2 (comparative) |
| Buffer | | | |
| NaOH/AGU(MHEC) (mol/mol) | 0.015 | 0 | 0 |
| Glyoxal/AGU(MHEC) (mol/mol) | 0.046 | 0.046 | 0.023 |
| Acid/AGU(MHEC) (mol/mol) | 0.008 | 0 | 0 |
| NaH$_2$PO$_4$*H$_2$O/AGU(MHEC) (mol/mol) | 0 | 0.008 | 0.008 |
| Na$_2$HPO$_4$/AGU(MHEC) (mol/mol) | 0 | 0.008 | 0.008 |
| Acid | Citric acid | — | — |
| crosslinked MHEC | | | |
| PRODUCT PROPERTIES | | | |
| pH | 5.7 | 6.9 | 7.0 |
| Viscosity (mPas) | 12140 | 12200 | 12400 |
| Total glyoxal (ppm) | 13885 | 15167 | 6796 |
| Free glyoxal (ppm) | 1279 | 1700 | 669 |
| ST (min) | 29 | 22 | 14 |
| SET (min) | 43 | 39 | 26 |
| aged crosslinked MHEC | | | |
| pH | 4.8 | 4.3 | 5.0 |
| Viscosity (mPas) | 9580 | 10980 | 10140 |
| ST (min) | 42 | 42 | 18 |
| SET (min) | 57 | 71 | 28 |
| Postcrosslinking [aged ST * 100/ST-100] (%) | 45 | 91 | 29 |

It becomes apparent that with use of the phosphate buffer (examples 2-1 and 2-2) in comparison to the cellulose ether (example 1), produced according to the prior art, the pH of the cellulose ether is raised and the viscosity prior to aging is identical. After aging of the samples, the viscosity dropped to a similar level. On the basis of the raised pH of the cellulose ether using the phosphate buffer in the glyoxal for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A final moisture content of less than 5% was achieved.

| | Batch No. | | | |
|---|---|---|---|---|
| | 2-1 (comparative) | 2-2 (comparative) | 3-1 | 3-2 |
| Buffer | | | | |
| NaOH/AGU(MHEC) (mol/mol) | 0 | 0 | 0 | 0 |
| Glyoxal/AGU(MHEC) (mol/mol) | 0.046 | 0.023 | 0.046 | 0.023 |
| Acid/AGU(MHEC) (mol/mol) | 0 | 0 | 0.004 | 0.004 |
| NaH$_2$PO$_4$*H$_2$O/AGU(MHEC) (mol/mol) | 0.008 | 0.008 | 0.008 | 0.008 |
| Na$_2$HPO$_4$/AGU(MHEC) (mol/mol) | 0.008 | 0.008 | 0.008 | 0.008 |
| Acid | — | — | Citric acid | Citric acid |
| crosslinked MHEC | | | | |

-continued

| | Batch No. | | | |
| --- | --- | --- | --- | --- |
| | 2-1 (comparative) | 2-2 (comparative) | 3-1 | 3-2 |
| PRODUCT PROPERTIES | | | | |
| pH | 6.9 | 7.0 | 5.7 | 6.0 |
| Viscosity (mPas) | 12200 | 12400 | 10980 | 11900 |
| Total glyoxal (ppm) | 15167 | 6796 | 14760 | 7957 |
| Free glyoxal (ppm) | 1700 | 669 | 2168 | 1028 |
| ST (min) | 22 | 14 | 34 | 37 |
| SET (min) | 39 | 26 | 48 | 51 |
| aged crosslinked MHEC | | | | |
| pH | 4.3 | 5.0 | 4.3 | 5.0 |
| Viscosity (mPas) | 10980 | 10140 | 8800 | 7220 |
| ST (min) | 42 | 18 | 44 | 37 |
| SET (min) | 71 | 28 | 58 | 50 |
| Postcrosslinking [aged ST * 100/ST-100] (%) | 91 | 29 | 29 | 0 |

Through the addition of citric acid as catalyst for the glyoxal crosslinking to the phosphate buffer, the ST was significantly increased. However, the products were not storage-stable, since the viscosity after aging decreased much more greatly than that of an MHEC without addition of acid in the glyoxal solution. The postcrosslinking after aging had fallen as a result of the addition of citric acid. The glyoxal crosslinking accordingly was more efficient; it was catalyzed by the acid.

Example 4

Water-moist MHEC (200 g of dry matter) with an average degree of substitution DS (methyl) of 1.55 and a molar degree of substitution MS (hydroxyethyl) of 0.22 and with a viscosity of 16 000 mPa·s was placed in an LK5 laboratory kneader from Erweka Apparatebau GmbH, where it was mixed with an aqueous solution of sodium dihydrogenphosphate·$H_2O$, disodium hydrogenphosphate, lactic acid, water and glyoxal. The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 µm sieve. A final moisture content of less than 5% was achieved in this way.

| | Batch No. | | | |
| --- | --- | --- | --- | --- |
| | 1 (comparative) | 2-1 (comparative) | 4-1 | 4-2 |
| Buffer | | | | |
| NaOH/AGU(MHEC) (mol/mol) | 0.015 | 0 | 0 | 0 |
| Glyoxal/AGU(MHEC) (mol/mol) | 0.046 | 0.046 | 0.046 | 0.023 |
| Acid/AGU(MHEC) (mol/mol) | 0.008 | 0 | 0.009 | 0.009 |
| $NaH_2PO_4$*$H_2O$/AGU(MHEC) (mol/mol) | 0 | 0.008 | 0.008 | 0.008 |
| $Na_2HPO_4$/AGU(MHEC) (mol/mol) | 0 | 0.008 | 0.008 | 0.008 |
| Acid | Citric acid | — | Lactic acid | Lactic acid |
| crosslinked MHEC | | | | |
| pH | 5.7 | 6.9 | 6.5 | 6.4 |
| Viscosity (mPas) | 12140 | 12200 | 11560 | 11920 |
| Total glyoxal (ppm) | 13885 | 15167 | 15529 | 7373 |
| Free glyoxal (ppm) | 1279 | 1700 | 1527 | 527 |
| ST (min) | 29 | 22 | 39 | 25 |
| SET (min) | 43 | 39 | 58 | 37 |
| aged crosslinked MHEC | | | | |
| pH | 4.8 | 4.3 | 4.2 | 4.4 |
| Viscosity (mPas) | 9580 | 10980 | 11220 | 10320 |
| ST (min) | 42 | 42 | 50 | 30 |
| SET (min) | 57 | 71 | 72 | 42 |
| Postcrosslinking [aged ST * 100/ST-100] (%) | 45 | 91 | 28 | 20 |

11           12

Through the addition of lactic acid as catalyst for the glyoxal crosslinking to the phosphate buffer, the ST was significantly increased. Accordingly, it was possible to reduce the amount of glyoxal used by half. Consequently, the total glyoxal content and the free glyoxal content in the MHEC were also considerably reduced. The product was no longer liable to labeling requirements. The loss in viscosity after aging was small and similar to that when using a pure phosphate buffer. As a result of the addition of lactic acid, the photocrosslinking after aging was lower than in the case of the MHEC without addition of acid in the phosphate buffer.

Example 5

Water-moist MHEC (200 g of dry matter) with an average degree of substitution DS (methyl) of 1.55 and a molar degree of substitution MS (hydroxyethyl) of 0.22 and with a viscosity of 16 000 mPa·s was placed in an LK5 laboratory kneader from Erweka Apparatebau GmbH, where it was mixed with an aqueous solution of sodium dihydrogenphosphate·H₂O, disodium hydrogenphosphate, acetic acid, water and glyoxal. The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A final moisture content of less than 5% was achieved.

As a result of the addition of acetic acid as catalyst for the glyoxal crosslinking to the phosphate buffer, it was possible to retain the ST even with halving of the amount of glyoxal used. Accordingly, the values for total glyoxal and unbound/free glyoxal in the MHEC had fallen significantly as well. The product was no longer liable to labeling requirements. The loss in viscosity after aging was small and similar to that when using a pure phosphate buffer. As a result of the addition of acetic acid, the postcrosslinking after aging was lower than in the case of the MHEC without addition of acid in the phosphate buffer.

Example 6

Water-moist MHEC (200 g of dry matter) with an average degree of substitution DS (methyl) of 1.55 and a molar degree of substitution MS (hydroxyethyl) of 0.22 and with a viscosity of 16 000 mPa·s was placed in an LK5 laboratory kneader from Erweka Apparatebau GmbH, where it was mixed with an aqueous solution of sodium dihydrogenphosphate-H₂O, disodium hydrogenphosphate, adipic acid, water and glyoxal. The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A final moisture content of less than 5% was achieved.

|  | Batch No. | | | |
|---|---|---|---|---|
|  | 1 (comparative) | 2-1 (comparative) | 2-2 (comparative) | 5-1 |
| Buffer |  |  |  |  |
| NaOH/AGU(MHEC) (mol/mol) | 0.015 | 0 | 0 | 0 |
| Glyoxal/AGU(MHEC) (mol/mol) | 0.046 | 0.046 | 0.023 | 0.023 |
| Acid/AGU(MHEC) (mol/mol) | 0.008 | 0 | 0 | 0.008 |
| NaH₂PO₄*H₂O/AGU(MHEC) (mol/mol) | 0 | 0.008 | 0.008 | 0.008 |
| Na₂HPO₄/AGU(MHEC) (mol/mol) | 0 | 0.008 | 0.008 | 0.008 |
| Acid | Citric acid | — | — | Acetic acid |
| crosslinked MHEC |  |  |  |  |
| pH | 5.7 | 6.9 | 7.0 | 6.4 |
| Viscosity (mPas) | 12140 | 12200 | 12400 | 12260 |
| Total glyoxal (ppm) | 13885 | 15167 | 6796 | 7835 |
| Free glyoxal (ppm) | 1279 | 1700 | 669 | 691 |
| ST (min) | 29 | 22 | 14 | 27 |
| SET (min) | 43 | 39 | 26 | 42 |
| aged crosslinked MHEC |  |  |  |  |
| pH | 4.8 | 4.3 | 5.0 | 4.8 |
| Viscosity (mPas) | 9580 | 10980 | 10140 | 11080 |
| ST (min) | 42 | 42 | 18 | 28 |
| SET (min) | 57 | 71 | 28 | 40 |
| Postcrosslinking [aged ST * 100/ST-100] (%) | 45 | 91 | 29 | 4 |

| | Batch No. | | | | | |
|---|---|---|---|---|---|---|
| | 1 (comparative) | 2-1 (comparative) | 2-2 (comparative) | 6-1 | 6-2 | 6-3 |
| Buffer | | | | | | |
| NaOH/AGU(MHEC) (mol/mol) | 0.015 | 0 | 0 | 0 | 0 | 0 |
| Glyoxal/AGU(MHEC) (mol/mol) | 0.046 | 0.046 | 0.023 | 0.046 | 0.023 | 0.016 |
| Acid/AGU(MHEC) (mol/mol) | 0.008 | 0 | 0 | 0.008 | 0.004 | 0.003 |
| $NaH_2PO_4*H_2O$/AGU(MHEC) (mol/mol) | 0 | 0.008 | 0.008 | 0.008 | 0.008 | 0.008 |
| $Na_2HPO_4$/AGU(MHEC) (mol/mol) | 0 | 0.008 | 0.008 | 0.008 | 0.008 | 0.008 |
| Acid | Citric acid | — | — | Adipic acid | Adipic actd | Adipic acid |
| crosslinked MHEC | | | | | | |
| pH | 5.7 | 6.9 | 7.0 | 5.0 | 5.6 | 5.0 |
| Viscosity (mPas) | 12140 | 12200 | 12400 | 12200 | 12260 | 11820 |
| Total glyoxal (ppm) | 13885 | 15167 | 6796 | 18033 | 7202 | 7243 |
| Free glyoxal (ppm) | 1279 | 1700 | 669 | 1121 | 543 | <400 |
| ST (min) | 29 | 22 | 14 | 55 | 37 | 34 |
| SET (min) | 43 | 39 | 26 | 77 | 50 | 52 |
| aged crosslinked MHEC | | | | | | |
| pH | 4.8 | 4.3 | 5.0 | 4.1 | 4.3 | 4.5 |
| Viscosity (mPas) | 9580 | 10980 | 10140 | 10830 | 10220 | 10180 |
| ST (min) | 42 | 42 | 18 | 87 | 37 | 27 |
| SET (min) | 57 | 71 | 28 | 92 | 51 | 40 |
| Postcrosslinking [aged ST * 100/ST − 100] (%) | 45 | 91 | 29 | 22 | 0 | 0 |

As a result of the addition of adipic acid as catalyst for the glyoxal crosslinking to the phosphate buffer, the ST was significantly increased. Accordingly, it was possible to reduce the amount of glyoxal used by two thirds.

Correspondingly, there were considerable reductions in the total glyoxal and the free glyoxal in the MHEC as well. The loss in viscosity after aging was low and similar to that when using a pure phosphate buffer. The postcrosslinking after aging was marginal or could no longer be found, owing to the addition of adipic acid. The product was therefore not liable to labeling requirements. The ST and the storage stability were the same as those of a cellulose ether produced according to the prior art.

Example 7

Water-moist MHEC (200 g of dry matter) with an average degree of substitution DS (methyl) of 1.62 and a molar degree of substitution MS (hydroxyethyl) of 0.21 and with a viscosity of 5000 mPa·s was placed in an LK5 laboratory kneader from Erweka Apparatebau GmbH. There the water-moist cellulose ether was mixed either with an aqueous solution of glyoxal, water, citric acid and sodium hydroxide (Batch No. 7-1, as a comparative) or with an aqueous solution of sodium dihydrogenphosphate-$H_2O$, disodium hydrogenphosphate, water and glyoxal (Batch No. 7-2, as a comparative) and mixed with the acid indicated in the table (Batch No. 7-3 to 7-6). The target moisture content for the MHEC of 73% was established using ice. When all of the ingredients had been added, the whole was kneaded for 30 min. The moist product was subsequently predried to a hand-dry state in a fluidized-bed dryer and dry-ground using an Alpine mill (model D 100 UPZ) employing a 180 μm sieve. A final moisture content of less than 5% was achieved in this way.

| | Batch No. | | | | | |
|---|---|---|---|---|---|---|
| | 7-1 (comparative) | 7-2 (comparative) | 7-3 | 7-4 | 7-5 | 7-6 |
| Buffer | | | | | | |
| NaOH/AGU(MHEC) (mol/mol) | 0.015 | 0 | 0 | 0 | 0 | 0 |
| Glyoxal/AGU(MHEC) (mol/mol) | 0.046 | 0.023 | 0.023 | 0.023 | 0.023 | 0.023 |
| Acid/AGU(MHEC) (mol/mol) | 0.004 | 0 | 0.008 | 0.008 | 0.008 | 0.008 |
| $NaH_2PO_4*H_2O$/AGU(MHEC) (mol/mol) | 0 | 0.008 | 0.008 | 0.008 | 0.008 | 0.008 |
| $Na_2HPO_4$/AGU(MHEC) (mol/mol) | 0 | 0.008 | 0.008 | 0.008 | 0.008 | 0.008 |
| Acid | Citric acid | — | Lactic acid | Salicylic acid | Acetic acid | Adipic acid |
| crosslinked MHEC | | | | | | |
| pH | 5.7 | 7.0 | 6.2 | 5.9 | 6.5 | 5.1 |
| Viscosity (mPas) | 4830 | 5010 | 4960 | 5050 | 4530 | 5030 |
| Total glyoxal (ppm) | 14683 | 7371 | 7621 | 7664 | 8234 | 6896 |
| Free glyoxal (ppm) | 1085 | 596 | 612 | 735 | 320 | 324 |
| ST (min) | 31 | 14 | 27 | 34 | 29 | 36 |
| SET (min) | 48 | 21 | 38 | 49 | 41 | 54 |
| aged crosslinked MHEC | | | | | | |
| pH | 4.6 | 4.9 | 4.2 | 4.4 | 4.5 | 4.4 |
| Viscosity (mPas) | 3970 | 4400 | 4170 | 4130 | 4390 | 4690 |

-continued

| | Batch No. | | | | | |
|---|---|---|---|---|---|---|
| | 7-1 (comparative) | 7-2 (comparative) | 7-3 | 7-4 | 7-5 | 7-6 |
| ST (min) | 46 | 16 | 24 | 31 | 26 | 31 |
| SET (min) | 61 | 24 | 32 | 42 | 34 | 42 |

From the table it is apparent that for different initial viscosities of the MHEC as well, it was possible to achieve the positive effects with the new crosslinker/buffer solutions.

The invention claimed is:

1. A cellulose derivative reversibly crosslinked with glyoxal comprising an organic acid having a basicity of one or more in a fraction of 0.002 to 0.015 mol and glyoxal in a fraction of 0.010 to 0.050 mol, in each case per mole of anhydroglucose units of the cellulose derivative, and also one or more alkaline earth metal salts and/or alkali metal salts of phosphoric acid as buffer substance, and the molar ratio of organic acid having a basicity of one or more to glyoxal is in the range from 1:1 to 1:12.

2. The cellulose derivative reversibly crosslinked with glyoxal as claimed in claim 1, wherein said cellulose derivative is a nonionic cellulose ether.

3. The cellulose derivative reversibly crosslinked with glyoxal as claimed in claim 2, wherein said cellulose derivative is methylhydroxyethylcellulose, methyl-hydroxypropylcellulose, methylcellulose, or a mixture thereof.

4. The cellulose derivative reversibly crosslinked with glyoxal as claimed in claim 1, wherein the acid having a basicity of one or more is acetic acid, lactic acid, salicylic acid, adipic acid, citric acid, tartaric acid and/or malic acid.

5. The cellulose derivative reversibly crosslinked with glyoxal as claimed in claim 4, wherein the acid having a basicity of one or more is lactic acid or adipic acid.

6. The cellulose derivative reversibly crosslinked with glyoxal as claimed in claim 1, wherein the buffer substance is alkali metal salts of phosphoric acid, and the alkali metal salts of phosphoric acid are sodium dihydrogenphosphate and disodium hydrogenphosphate and the sodium dihydrogenphosphate and disodium hydrogenphosphate are contained therein in an amount in each case of 0.002 to 0.015 mol per mole of anhydroglucose units of the cellulose ether.

7. The cellulose derivative reversibly crosslinked with glyoxal as claimed in claim 6, wherein the amount of sodium dihydrogenphosphate and disodium hydrogenphosphate contained therein is in each case 0.005 to 0.009 mol per mole of anhydroglucose units of the cellulose ether.

8. The cellulose derivative reversibly crosslinked with glyoxal as claimed in claim 1, wherein said cellulose derivative contains less than 1000 ppm of free glyoxal.

9. The cellulose derivative as claimed in claim 1, wherein the cellulose derivative does not comprise water-soluble borates or aluminum salts.

10. A process for producing cellulose derivatives reversibly crosslinked with glyoxal and thus having delayed water-solubility, comprising the steps of:

a) providing a water-moist cellulose derivative, b) providing an aqueous solution comprising glyoxal, one or more alkaline earth metal salts and/or alkali metal salts of phosphoric acid as buffer substance, c) mixing the aqueous solution from b) with the cellulose derivative from a) at a temperature between 20 to 70° C. to achieve reversible crosslinking of the cellulose derivative, d) drying the reversibly crosslinked cellulose derivative and e) grinding the cellulose derivative, where steps d) and e) may be combined into a grinding-drying operation, wherein the aqueous solution as per b) comprises an organic acid having a basicity of one or more, where a monobasic, dibasic, tribasic or polybasic organic acid is present in an amount of 0.002 to 0.015 mol and the glyoxal is present in an amount of 0.010 to 0.050 mol, in each case per mole of anhydroglucose units of the cellulose derivative, the monobasic organic acid to glyoxal molar ratio is in the range from 1:1 to 1:6, the dibasic organic acid to glyoxal molar ratio is in the range from 1:1 to 1:10, and the tribasic organic acid to glyoxal molar ratio is in the range from 1:2 to 1:12.

11. The process as claimed in claim 10, wherein the cellulose derivative is a nonionic cellulose ether.

12. The process as claimed in claim 11, wherein the cellulose derivative is a methylhydroxyethylcellulose, methylhydroxypropylcellulose, methylcellulose, or a mixture thereof.

13. The process as claimed in claim 10, wherein the cellulose derivative is a cellulose ether which, after a hot-water wash, is a filter cake having a dry-matter content of 30 to 70%.

14. The process as claimed in claim 13, wherein the process further comprises adding and kneading the filter cake with a crosslinker solution consisting of glyoxal, salts of phosphoric acid, an organic acid and water with continuous mixing and subsequently drying or grinding or being subjected to a grinding-drying operation.

15. The process as claimed in claim 14, wherein the process further comprises admixing the glyoxal with the cellulose ether in a fraction of not more than 0.035 mol per mole of anhydroglucose units of the cellulose ether.

16. The process as claimed in claim 15, wherein 0.01 to 0.03 mol of glyoxal is admixed to the cellulose ether per mole of anhydroglucose units of the cellulose ether.

17. The process as claimed in claim 10, wherein the process further comprises admixing the organic acid having a basicity of one or more into the cellulose ether in a fraction of 0.004 to 0.010 mol per mole of anhydroglucose unit of the cellulose ether.

18. The process as claimed in claim 10, wherein the organic acid having a basicity of one or more is an aliphatic, aromatic and/or heterocyclic, saturated or unsaturated carboxylic acid having 1 to 7 carbon atoms and one to three carboxyl group(s), where the organic acid may contain functional groups.

19. The process as claimed in claim 18, wherein the organic acid having a basicity of one or more is acetic acid, lactic acid, salicylic acid, adipic acid, citric acid, tartaric acid and/or malic acid.

20. The process as claimed in claim 19, wherein the organic acid having a basicity of one or more is lactic acid or adipic acid.

21. The process as claimed in claim 18, wherein the organic acid having a basicity of one or more is an aliphatic saturated or unsaturated carboxylic acid and the functional groups are hydroxyl groups and/or amino groups.

22. The process as claimed in claim 10, wherein the buffer substance is alkali metal salts of phosphoric acid, and the alkali metal salts of phosphoric acid are sodium dihydrogenphosphate and disodium hydrogenphosphate.

23. The process as claimed in claim 22, wherein the sodium dihydrogenphosphate and disodium hydrogenphosphate are admixed to the cellulose ether each in an amount of 0.003 to 0.015 mol per mole of anhydroglucose units of the cellulose ether.

24. The process as claimed in claim 22, wherein the sodium dihydrogenphosphate and disodium hydrogenphosphate are admixed to the cellulose ether each in an amount of 0.005 to 0.009 mol per mole of anhydroglucose units of the cellulose ether.

25. The process as claimed in claim 10, wherein the buffer/crosslinker solution has a pH of between 3 and 8.

26. The process as claimed in claim 25, wherein the buffer/crosslinker solution has a pH of between 4 and 6.5.

27. The process as claimed in claim 10, wherein the cellulose derivative has a solvation delay of at least 25 minutes.

28. The process as claimed in claim 10, wherein the cellulose derivative has a solvation delay of 25 to 55 minutes.

29. The process as claimed in claim 10, wherein the aqueous solution does not comprise water-soluble borates or aluminum salts.

\* \* \* \* \*